United States Patent
Johima

[15] 3,652,257
[45] Mar. 28, 1972

[54] FLUOROPHENOXY-PYRIDAZINES AS SELECTIVE HERBICIDES

[72] Inventor: Teruomi Jojima, Tokyo, Japan
[73] Assignee: Sankyo Company Limited, Tokyo, Japan
[22] Filed: Feb. 24, 1969
[21] Appl. No.: 801,745

[30] Foreign Application Priority Data

Feb. 28, 1968 Japan..................................43/12727

[52] U.S. Cl. ..............................................71/92, 260/250 A
[51] Int. Cl. ..........................................................A01n 9/22
[58] Field of Search........................................71/92; 260/250

[56] References Cited

UNITED STATES PATENTS

| | | | |
|---|---|---|---|
| 2,905,672 | 9/1959 | Steck.....................................260/250 |
| 3,399,987 | 9/1968 | Woods et al..............................71/92 |
| 3,427,146 | 2/1969 | Tamura et al..............................71/92 |

FOREIGN PATENTS OR APPLICATIONS

| 15,716 | 5/1966 | Japan........................................71/92 |
|---|---|---|
| 6,358 | 6/1966 | Japan........................................71/92 |

OTHER PUBLICATIONS

Tamura et al., II, " Synthesis of Pyridazine Ders. etc.," (1963) CA60 p. 2,928 (1964)
Tamura et al., III, " 3-Phenoxypyridazine as a New etc."; (1966) CA65 p. 4,563 (1966)
Jojima et al., " Syn. of Pyridazine Ders. etc."; (165) CA63 p. 601 (1965)

Primary Examiner—Lewis Gotts
Assistant Examiner—G. Hollrah
Attorney—McGlew and Toren

[57] ABSTRACT

Herbicidal composition which comprises as an active ingredient of a 3-phenoxypyridazine compound having the formula

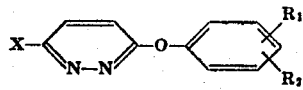

wherein X is hydrogen atom or chlorine atom, $R_1$ is trifluoromethyl group or fluorine atom and $R_2$ is hydrogen atom or chlorine atom, provided that, where X is hydrogen atom, $R_1$ is trifluoromethyl group or fluorine atom and $R_2$ is hydrogen atom or chlorine atom and, where X chlorine atom, $R_1$ is trifluoromethyl group and $R_2$ is hydrogen atom or chlorine atom and an agriculturally-acceptable carrier. Method for inhibiting the growth of undesirable plants which comprises applying to the locus to be protected a herbicidally effective amount of said 3-phenoxypyridazine compound.

3 Claims, No Drawings

FLUOROPHENOXY-PYRIDAZINES AS SELECTIVE HERBICIDES

This invention relates to a new use of certain 3-phenoxypyridazine compounds as a herbicide. More particularly, it relates to a method for inhibiting the growth of undesirable plants which comprises applying to the locus to be protected a herbicidally effective amount of such 3-phenoxypyridazine compound. Also, it relates to a herbicidal composition which comprises as an active ingredient such 3-phenoxypyridazine compound and an agriculturally-acceptable carrier. Still more particularly, it is concerned with a method for inhibiting the growth of undesirable plants, i.e., a wide variety of harmful weeds which comprises applying to the locus to be protected, in a herbicidally effective amount, a 3-phenoxypyridazine compound having the formula

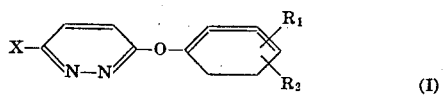

wherein X is hydrogen atom or chlorine atom, $R_1$ is trifluoromethyl group or fluorine atom and $R_2$ is hydrogen atom or chlorine atom, provided that, where X is hydrogen atom, $R_1$ is trifluoromethyl group or fluorine atom and $R_2$ is hydrogen atom or chlorine atom and where X is chlorine atom, $R_1$ is trifluoromethyl group and $R_2$ is hydrogen atom or chlorine atom. It is also concerned with a herbicidal composition which comprises as an active ingredient such a 3-phenoxypyridazine compounds (I) as specified hereinabove, together with an agriculturally-acceptable carrier.

Herbicidal activity of some 3-phenoxypyridazine compounds was reported in the art. Thus, it was disclosed in Agricultural and Biological Chemistry, 27, 728 (1963) and ibid, 29, 157 (1965) that some 6-chloro-3-alkyl(chloro, alkoxy or nitro)substituted phenoxypyridazine compounds show herbicidal activities. It was also shown in Agricultural and Biological Chemistry, 30, 423, (1966) that 3-phenoxypyridazine shows a desirable herbicidal activity in a submerged pot test. Also, it was found that the 3-phenoxypyridazine having the formula

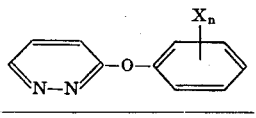

wherein X represents hydrogen atom, methyl group or chlorine atom and n is an integer of 1 to 5 inclusive; each X may be the same or different and, when n is an integer of 4 or 5, each X represents chlorine atom as well as some acid addition salts thereof show potent herbicidal activities on a wide variety of weeds, especially grasses and perennial weeds (Netherlands Pat. application No. 660,4248, filed by Sankyo Company Limited, Japan and laid open to public inspection on Aug. 26, 1966).

As a result of further extensive investigations on herbicidal activity of numerous 3-phenoxypyridazine compounds, it has now been found that a specific group of the 3-phenoxypyridazine compounds having the formula (I) show similar herbicidal effects on such undesirable plants as, for example, grasses and perennial weeds and especially they show potent herbicidal effects on the broad-leafed weeds without any degree of phytotoxicity and also that they show favorable selective herbicidal effects on beneficial plants, for example, stone-leek, carrot, spinach and the like, as compared with such known 3-phenoxypyridazine compounds.

It is, accordingly, a primary object of this invention to provide a novel and effective method for inhibiting growth of undesirable plants such as grasses, perennial and broad-leafed weeds and so on which comprises applying to the locus to be protected a herbicidally effective amount of the 3-phenoxypyridazine compound (I) as specified above. It is another object of this invention to provide a herbicidal composition which comprises as an active ingredient the above-specified 3-phenoxypyridazine compounds (I) and an agriculturally-acceptable carrier, if desired together with a suitable adjuvant. Other objects of this invention will become apparent to those skilled in the art with reference to the detailed description of the invention.

The 3-phenoxypyridazine compounds (I) which may be employed as an active ingredient in this invention are new compounds which were not disclosed in prior art literatures.

These 3-phenoxypyridazine compounds which may be employed as an active ingredient in this invention can be easily prepared by any of the following procedures; (a) by melting 3-chloropyridazine together with the corresponding substituted phenol in the presence of a base or (b) by catalytic reduction of the corresponding 3-substituted phenoxy-6-chloropyridazine.

More particularly, the former procedure (a) may be preferably carried out by melting 3-chloropyridazine together with a substituted phenol and a base such as anhydrous potassium or sodium carbonate in the absence of a solvent. In this procedure, the melting temperature is preferably in the range of about 100°–180° C., the higher temperature being sometimes undesirable because of possible decomposition of a starting 3-chloropyridazine. The reaction is usually effected in about 5–15 minutes.

The latter procedure (b) may be preferably carried out by any of various procedure for catalytic reduction well-known in the art, most preferably by employing Raney nickel or palladium on carbon. The reduction may be generally conducted at normal temperature and under pressure or under atmospheric pressure, suitably with heating to about 40°–50° C., in the presence of a solvent such as an organic solvent, for example, a lower alcohol, benzene, toluene, 2-methoxyethanol, glacial acetic acid or ethyl acetate, a mixture of water and any of these organic solvents, but preferably in the presence of a lower alcohol, for example, methanol because of the solubility of a starting material therein as well as easiness of handling. In both procedures, the final product may be recovered by a known technique.

Representative examples of the 3-phenoxypyridazine compounds having the formula (I) are given hereinbelow only for the purpose of illustration:

1. 3-(2-fluorophenoxy)pyridazine (m.p. 57°–58° C.);
2. 3-(3-fluorophenoxy)pyridazine (m.p. 63°–65° C.);
3. 3-(4-fluorophenoxy)pyridazine (m.p. 87°–89° C.);
4. 3-(2-chloro-4-fluorophenoxy)pyridazine (m.p. 114°–116 ° C.);
5. 3-(2-trifluoromethylphenoxy)pyridazine (m.p. 67°–68° C.);
6. 3-(2-trifluoromethylphenoxy)-6-chloropyridazine (b.p. 138°–143° C./0.85 mm. Hg);
7. 3-(3-trifluoromethylphenoxy)pyridazine (m.p. 50°–51° C.);
8. 3-(3-trifluoromethylphenoxy)-6-chloropyridazine (m.p. 63°–65 C.);
9. 3-(2-chloro-5-trifluoromethylphenoxy)pyridazine (m.p. 76° C.);
10. 3-(2-chloro-5-trifluoromethylphenoxy)-6-chloropyridazine (m.p. 106° C.);
11. 3-(3-trifluoromethyl-4-chlorophenoxy)pyridazine (m.p. 97°–98 C.); and
12. 3-(3-trifluoromethyl-4-chlorophenoxy)-6-chloropyridazine p(m.p. 78°–79° C.).

The active compounds (I) in this invention can be applied in any of various types of the compositions commonly employed in the art. In general, the active compouns can be diluted or extended with an agriculturally-acceptable carrier commonly employed in the art such as inert solids, water and organic liquids.

The active compounds (I) will be included in such compositions in sufficient amount so that they can exert a herbicidal effect. Usually from about 0.5–95 percent by weight of the active compounds may be incorporated into such formulations.

Solid compositions can be in the form of powders or dusts. Concentrated solid compositions, if desired, may be prepared and diluted with inert solids to form dusts prior to application. Natural clays, higher absorptive such as attapulgite or relatively non-absorptive such as china clays, diatomaceous earth, bentonite, synthetic fine silica, calcium silicate, talc, pyrophyllite, and other agriculturally-acceptable solid carriers conventionally employed in powder herbicidal compositions can be satisfactorily used. The active compound usually makes up from about 0.5–90 percent, preferably from about 2–10 percent of these powder compositions. The solids ordinarily should be very finely divided.

Liquid compositions including the active compound (I) can be prepared by admixing the active compound with a suitable liquid diluent medium, together with a suitable emulsifying agent. Typical of the liquid media commonly employed are methanol, benzene, toluene and the like. The active ingredient usually makes up from about 0.5–50 percent of these liquid compositions. Some of these compositions are designated to be used as such, and others to be diluted or extended with large quantities of a suitable liquid medium such as water.

Compositions in the form of wettable powders can include one or more surface active agents, such as wetting or dispersing agents. The surface active agents cause the compositions of wettable powders to disperse easily in water to give aqueous sprays. The active ingredient usually makes up from about 50–80 percent of the compositions. The surface active agents employed can be of the anionic, cationic or nonionic types. They include, for example, sodium long-chain carboxylates, alkylaryl sulfonates, sodium lauryl sulfate, polyethylene oxides, lignin sulfonates and other surface active agents commonly employed in the art.

When used as a pre-emergence treatment, it will be desirable to include a fertilizer, an insecticide, a fungicide or other herbicide such as 2,4-dichlorophenoxyacetic acid, 2-methyl-4-chlorophenoxyacetic acid and salts, amides and esters thereof, as well as sodium pentachlorophenoxide, 2,4-dichlorophenyl-4'-nitrophenyl ether, 3-methylphenyl-4'-nitrophenyl ether, 2,4,6-trichlorophenyl-4'-nitrophenyl ether, 2-methylthio-4,6-bis(ethylamino)-1,3,5-triazine and the like.

In order to illustrate the preparation of the herbicidal composition in this invention, the following examples are given. It is, of course, to be understood that this invention is not limited thereto. All parts are given by weight unless otherwise stated.

EXAMPLE 1

Fifty parts of 3-(2-fluorophenoxy)pyridazine, 45 parts of bentonite and 5 parts of polyoxyethylene alkyl aryl ether were mixed and pulverized to give a wettable powder.

EXAMPLE 2

A mixture of 10 parts of 3-(3-fluorophenoxy)pyridazine, 50 parts of bentonite, 40 parts of talc and a small amount of sodium alkylbenzene sulfonate was mixed up with water to make granules, which were then dried and screened to give a granule having a particle size in the range of 20–80 mesh.

EXAMPLE 3

Fifty parts of 3-(4-fluorophenoxy)pyridazine, 45 parts of bentonite and 5 parts of sodium alkyl benzene sulfonate were homogeneously mixed to give a wettable powder.

EXAMPLE 4

Five parts of 3-(3-trifluoromethylphenoxy)pyridazine, 50 parts of bentonite, 38 parts of talc and 7 parts of sodium alkylbenzene sulfonate were uniformly mixed up with water to make granules, which were then dried and screened to give a granule having a particle size in the range of 20–80 mesh.

The herbicidal method of this invention comprises applying the above-specified active compounds to the locus or area to be protected from undesirable plant growth. The active compound is, of course, applied in an amount sufficient to exert the desired herbicidal action, usually in such an amount sufficient to provide about 50–300 g. of the active compound per 10 ares.

It may be desirable to apply the active compound, in the form of the aforesaid composition, directly to the soil prior to weed infection, which is known as a pre-emergence treatment.

The herbicidal effects of the active compounds in this invention are more fully illustrated by the following experiments.

EXPERIMENT 1

Pre-emergence Treatment Test

Seeds of the following weeds, i.e., barnyardgrass, Taisai (*Brassica chinensis* L.) and common chick weed, each being 50 seeds, were sowed in a ground plot of 1 square meter, in admixture with the surface soil in the depth of about 2 cm. thereunder. The test compounds as indicated hereinbelow were formulated into wettable powders by a conventional procedure. Those wettable powders were diluted with water and applied by spraying to the seeded ground at rates of 12 g./are and 40 g./are of the test compound. The plot was placed in a greenhouse. On the 25th day after application, germination-inhibiting or killing rates for the test compound were visually investigated. The results are summarized in the following Table 1.

TABLE I

[Killing rates of 3-phenoxypyridazine compounds against grasses and broad-leafed weeds]

| | Killing rate percent | | | | | |
|---|---|---|---|---|---|---|
| Weed | Barnyardgrass | | Taisai | | Common chick weed | |
| Application rate (g./are) | 12 | 40 | 12 | 40 | 12 | 40 |
| Test compound*: | | | | | | |
| 1 | 100 | 100 | 100 | 100 | 100 | 100 |
| 2 | 90 | 100 | 80 | 80 | 80 | 90 |
| 3 | 70 | 90 | 70 | 80 | 80 | 95 |
| 4 | 80 | 95 | 80 | 90 | 90 | 100 |
| 5 | 100 c | 100 c | 100 c | 100 c | 100 c | 100 c |
| 7 | 80 | 100 c | 100 | 100 c | 90 | 100 c |
| 8 | 75 | 85 | 85 | 100 c | 75 | 100 c |
| 9 | 85 | 100 c | 100 c | 100 c | 85 | 100 c |
| 11 | 85 | 100 c | 100 c | 100 c | 100 c | 100 c |
| 12 | 75 | 85 | 80 | 85 | 85 | 100 c |
| 3-phenoxypyridazine | 90 | 100 | 40 | 70 | 50 | 60 |
| 3-(2-methylphenoxy)-pyridazine | 90 | 100 | 50 | 70 | 55 | 60 |
| 3-(2,5-dimethylphenoxy)pyridazine | 90 | 100 | 60 | 80 | 70 | 90 |
| 3-(3-methyl-4-isopropylphenoxy)pyridazine | 20 | 30 | 0 | 70 | 20 | 40 |
| 3-(3-methyl-4-sec-butylphenoxy)-pyridazine | 40 | 100 | 20 | 70 | 30 | 50 |
| Non-treated | 5 | | 3 | | 10 | |

* Test compound is indicated by means of the number as given to the phenoxypyridazine compounds listed hereinabove.

NOTE.—The symbol (c) marked right-upwardly to the number means that all of the weeds were killed due to severe chlorosis.

It will be noted from the above results that the active compounds in this invention show similar herbicidal activities against grasses and much higher activities in the inhibition of germination and killing of broad-leafed weeds, as compared with the control 3-phenoxypyridazines.

EXPERIMENT 2

Herbicidal Test in Paddy Field

Soils for paddy field were charged into a pot of a surface area of 150 square centimeters, an appreciate number of rice plants (at four or five leaf stage) and slender spikerush were transplanted, seeds of barnyard grass were sowed and then water was filled at a depth of about 3 cm. over the soil surface. On the next day, the wettable powders containing the test compounds shown below and formulated as in the above Experiment 1, were diluted with water and applied by spraying to the soil at a rate given below of the specific compound per are. After 30 days of the application, the growth of slender spikerush, barnyard grass and spontaneously growing broadleafed weeds as well as that of rice plants were visually observed. The results are summarized in the following Table II. In this table, herbicidal activities of the test compounds against barnyardgrass and broad-leafed weeds were evaluated upon the following grades;

Herbicidal rating

5 : 0 – 10 percent (expressed in terms of percentage of the number of growing weeds in the test plots, provided that of growing weeds in a non-treated plot is defined as 100).
4 : 11 – 20%   ( - ditto - )
3 : 21 – 40%   ( - ditto - )
2 : 41 – 60%   ( - ditto - )
1 : 61 – 80%   ( - ditto - )
0 : 81 – 100%  ( - ditto - )

And, herbicidal activities of the test compound against slender spikerush were evaluated upon the grade as defined hereinbelow.
5 : dead
4 : severely damaged
3 : considerably damaged
2 : moderately damaged
1 : slightly damaged
0 : not damaged Table II – Continued

| | | | | | |
|---|---|---|---|---|---|
| 3-(2-ethylphenoxy)-pyridazine | 30 | 5 | 2 | 4 | (1) |
| 3-(2,4-dimethylphenoxy)-pyridazine | 10 | 4 | 2 | 3 | (1) |
| 3-(3-methyl-4-isopropylphenoxy)-pyridazine | 10 | 1 | 0 | 0 | (1) |

1 Not observed.

* See footnote at end of Table I.

It will be clearly shown from the above results that the active compounds in this invention exert a potent herbicidal activity against various weeds, especially broad-leafed weeds, without phytotoxicity to rice plants, as compared with those of the control 3-phenoxypyridazine compounds.

EXPERIMENT 3

Susceptibility test of 3-phenoxypyridazine compounds to beneficial plants

Following the same test procedure and condition as described in the above Experiment 1 and the same herbicidal ratings as referred to barnyardgrass and broad-leafed weeds in the above Experiment 2 except that rates of the active compound per are were 25.0 g., 12.5 g. and 6.25 g., as a host plant were employed stone-leek, carrot and spinach, and as a weed seed was employed large crabgrass, susceptibility of those 3-phenoxypyridazine compounds as specified below was investigated to such beneficial plants.

The results are summarized in the following Table III.

TABLE III

| | Killing rate | | | | | | | | | | | |
|---|---|---|---|---|---|---|---|---|---|---|---|---|
| Host plant or weed | Stone-leek | | | Carrot | | | Spinach | | | Large crabgrass | | |
| Rate (g./are) | 25.0 | 12.5 | 6.25 | 25.0 | 12.5 | 6.25 | 25.0 | 12.5 | 6.25 | 25.0 | 12.5 | 6.25 |
| Test compound*: | | | | | | | | | | | | |
| 1 | 3 | 1 | 0 | 5 | 2 | 0 | 4 | 3 | 0 | 5 | 5 | 5 |
| 3 | 3–4 | 0 | 0 | 0 | 0 | 0 | 3–4 | 0 | 0 | 4 | 4 | 3 |
| 4 | 2 | 0 | 0 | 2 | 0 | 0 | 3 | 1 | 1 | 4 | 4 | 3 |
| Control: 3-(2-methylphenoxy)-pyridazine | 3 | 2 | 2 | 4 | 4 | 4 | 3 | 3 | 3 | 5 | 5 | 5 |

*See footnote at end of Table I.

TABLE II

Herbicidal activity of 3-phenoxypyridazine compound against broad-leafed weeds and perennial weeds

| | | Herbicidal activity | | | |
|---|---|---|---|---|---|
| | Application rate g./are | Barnyardgrass | Broadleafed weed | Slender spikerush | Phytotoxicity to rice plant |
| Test compound * | | | | | |
| 1 | 30 | 5 | 5 | 5 | — |
| 2 | 30 | 4–5 | 4 | 4 | — |
| 3 | 30 | 4 | 3 | 3 | — |
| 4 | 30 | 5 | 5 | 4–5 | — |
| 5 | 10 | 5 | 5 | 5 | — |
| 7 | 10 | 4 | 5 | 5 | — |
| 9 | 10 | 4 | 5 | 5 | — |
| 11 | 10 | 5 | 5 | 5 | — |
| Control: 3-phenoxypyridazine | 30 | 4 | 2 | 3 | (1) |

It will be noted from the above results that the 3-phenoxypyridazine compounds in this invention do not exert any unfavourable degree of killing effect on beneficial plants, as compared with the control 3-phenoxypyridazine, and on the other hand, they show a considerable degree of herbicidal activity against large crabgrass - harmful weed.

What is claimed is:

1. A method for inhibiting the growth of undesirable plants in the presence of stone leek which comprises applying to the locus thereof a herbicidally effective amount of 3-(2-fluorophenoxy)-pyridazine.

2. A method for inhibiting the growth of undesirable plants in the presence of carrots which comprises applying to the locus thereof a herbicidally effective amount of 3-(2-fluorophenoxy)-pyridazine.

3. A method for inhibiting the growth of undesirable plants in the presence of spinach which comprises applying to the locus thereof a herbicidally effective amount of 3-(2-fluorophenoxy)-pyridazine.

* * * * *